No. 804,120. PATENTED NOV. 7, 1905.
J. HASÉ.
HUMIDIFIER.
APPLICATION FILED AUG. 4, 1904.
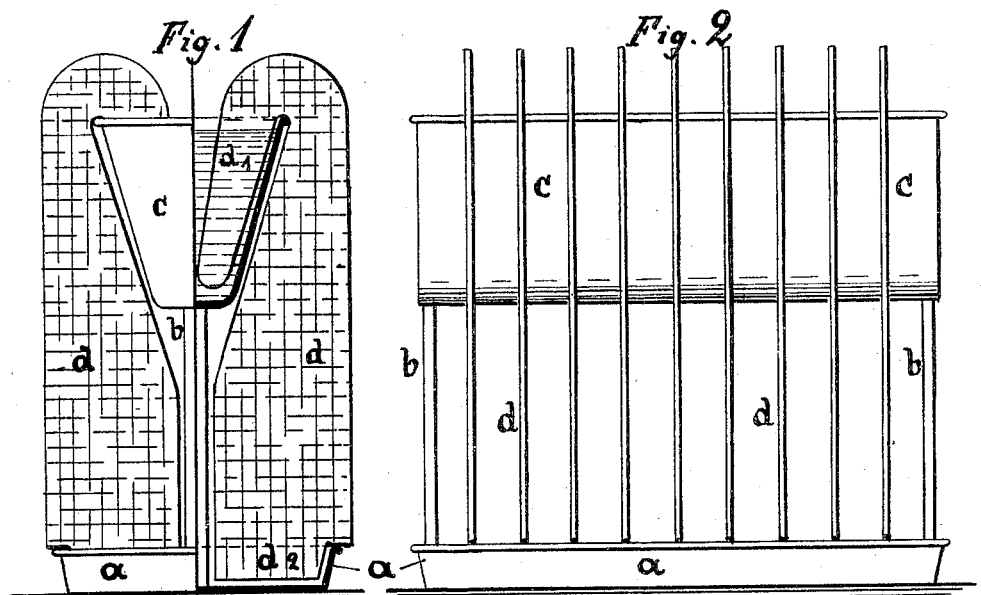
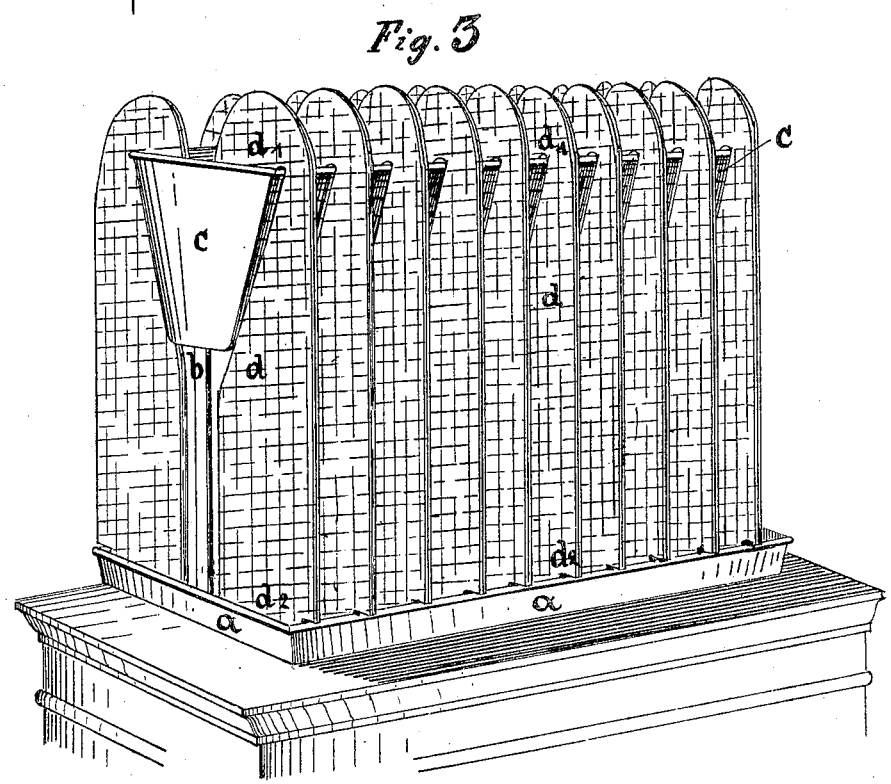

UNITED STATES PATENT OFFICE.

JEAN HASÉ, OF WIESBADEN, GERMANY.

HUMIDIFIER.

No. 804,120.  Specification of Letters Patent.  Patented Nov. 7, 1905.

Application filed August 4, 1904. Serial No. 219,482.

*To all whom it may concern:*

Be it known that I, JEAN HASÉ, a subject of the Emperor of Germany, residing at Wiesbaden, in the Province of Hesse-Nassau, Germany, have invented a new and useful Humidifier, of which the following is a specification.

My invention relates to apparatus adapted to humidify or moisten the air in rooms, offices, shops, &c.; and the object is to provide an apparatus small in size with comparatively large surfaces for giving off moisture.

My invention consists of a humidifier composed of a pan, a trough supported above said pan and containing water or other liquid, and one or more sets of elements of absorbing material adapted to feed from the water in said trough and saturate the atmosphere with moisture.

My invention will be more fully understood taken in connection with the accompanying drawings, forming part hereof, and in which—

Figure 1 is a view showing the apparatus partly in end elevation and partly in transverse section. Fig. 2 is a longitudinal elevation showing the pan, the trough superposed thereon, and the absorbent elements; and Fig. 3 is a perspective view of my humidifier.

Referring now to the drawings for a further description of my invention, $a$ is a pan made of sheet-iron, glass, porcelain, or other material. $c$ is a trough of similar material and supported in the pan by struts or feet $b$, resting either on the bottom of the pan $a$ or being fastened to said pan in any suitable manner.

$d$ represents elements of absorbent material, as felt, pumice-stone, &c., and are provided with the goosenecks $d'$ and the broad flat portions $d^2$. These elements $d$ are suspended over the longitudinal edges of the trough $c$, so that the goosenecks $d'$ thereof are almost in contact with the bottom of the trough $c$ and the broad flat portions $d^2$ almost in contact with the bottom of the pan $a$.

The operation of my improved humidifier is as follows: After the elements $d$ are placed in position in the trough $c$ and pan $a$ water or other liquid is poured into the trough $c$. The capillary action of the absorbent material of the elements $d$ maintains the whole of the elements in a moist state, and the surfaces of the elements of course give off the moisture to the surrounding atmosphere. Should the water be taken from the trough $c$ too rapidly through the action of the elements and not have time sufficient for evaporation, the superfluous water will collect in the pan $a$, and in case the trough $c$ is devoid of liquid the elements $d$ will absorb the water or liquid from the pan $a$, it being of course understood that from time to time the supply of water has to be replenished to make good for the evaporation.

Having thus described the nature and objects of my invention, what I claim as new, and desire to secure by Letters Patent, is—

A humidifier comprising a pan, a trough located above said pan, standards connecting said trough to said pan, a series of elements of porous material as felt, pumice-stone, &c. arranged at each longitudinal edge of said trough and extending at right angles thereto, goosenecks formed at the upper ends of the elements and adapted to support the elements upon the edge of said trough, the lower ends of the elements extending into the said pan substantially as and for the purposes set forth.

In witness whereof I have hereunto set my hand in the presence of two subscribing witnesses.

JEAN HASÉ.

Witnesses:
 JEAN GRUND,
 CARL GRUND.